Patented Jan. 5, 1932

1,840,243

UNITED STATES PATENT OFFICE

JOHN McGAVACK, OF LEONIA, NEW JERSEY, ASSIGNOR TO GENERAL RUBBER COMPANY, OF NEW YORK, N. Y., A CORPORATION OF NEW JERSEY

PROCESS OF IMPROVING PROPERTIES OF RUBBER, AND PRODUCT

No Drawing. Application filed December 13, 1929. Serial No. 413,930.

This invention relates to a process for improving the properties of rubber, and to the products, more particularly to a process for improving the physical properties of evaporated rubbers.

In rubber manufacturing operations it is desirable that during the manipulation and treatment of the rubber certain properties be present, such as ease of breakdown, smooth milling, calendering and extruding, and in general that the rubber be capable of conversion into a soft well plasticized material. In the case of the vulcanizate of such material, it is desirable in many articles which are subjected to flexing, such as tires, hose, belting, etc., that there be a maximum resistance to separation between the rubber and fibrous portions of the article caused by the flexing, and it is also desirable in many rubber articles, such as tires, conveyor belts and footwear, that there be a maximum resistance to abrasion. The present invention relates primarily to improving the physical properties of rubbers, both in their raw and vulcanized states, obtained by evaporating rubber latex or other water dispersions of rubber.

An object of the invention is to provide a method for improving the physical properties of rubbers, both before and after their vulcanization, derived from water dispersions of rubber by drying. Another object is to provide a method for improving the breakdown, calendering and extruding properties of such dried rubbers. Another object is to provide a method for improving the flexing and abrasion resistance of vulcanized rubber articles formed from such dried rubbers. The invention also resides in the products of the process.

The invention consists broadly in incorporating in a water dispersion of rubber, either simultaneously or consecutively, a volatile base salt of a higher fatty acid and a volatile base salt of a strong water soluble acid, and withdrawing moisture from the dispersion, and if desired vulcanizing the product.

The invention is particularly applicable to the improvement of all-solids-content-latex rubbers, that is, rubbers obtained by withdrawing moisture from natural rubber latex, but it is also applicable to rubbers obtained by the evaporation of artificial latices. When alkali soaps are added to an ammonia latex and the latter then dried, the abrasion resistance of the resulting rubber is improved to a considerable extent and the flexing resistance may also be increased somewhat, and a similar improvement is noted in the case of formaldehyde preserved latex but not to so great an extent. However, the addition of the soaps in general produces a dried rubber which is hard and does not break down as easily on the mill and does not produce as smooth calendering and extruding a rubber. When volatile base salts of strong acids are added to an ammonia or formaldehyde preserved latex and the latter then dried, the resulting rubber is greatly improved in its breakdown property and produces a soft, smooth milling and calendering rubber, and the vulcanized rubber resulting from this is considerably improved in its flexing resistance, but its abrasion resistance is reduced or only slightly increased.

I have found that by the addition to latex of combinations of volatile base salts of higher fatty acids and volatile base salts of strong water soluble acids, the crude rubber obtained by evaporating the water content of such latex is greatly improved in its breakdown properties and produces a soft, easy milling and calendering rubber, while at the same time this rubber when vulcanized has a very much higher flexing resistance and is also improved in its abrasion resistance.

Among the fatty acids which may be used are in general those containing from 10 to 30 carbon atoms and they may be of either the saturated or unsaturated series. Particularly useful acids of this series are oleic, stearic, palmitic, lauric, margaric and undecylinic. While other volatile bases such as amines may be used, it is preferred for cheapness, to use the ammonium soaps of the acids. Mixtures of the ammonium soaps of various of these acids may be employed, and there may also be used with good results, the ammonium salts or soaps of certain vegetable oils such as cocoanut or palm.

I have found that among the water soluble strong acids whose volatile base salts may be added, there may be used, hydrochloric, hydrobromic, hydrofluoric, phosphoric, nitric, sulphurous, lactic, oxalic, citric and chloracetic acids, and here again it is preferred on account of cheapness, to use as the volatile base, the ammonium salts of the acids, and if desired, mixtures of salts of different acids may be used. In general, the acids should be capable of decomposing ammonium soaps and ammonium proteinates. The volatile base soap of the fatty acid and the volatile base salt of the strong water soluble acid may be added either simultaneously or consecutively.

As specific illustrations of the invention, the following are given:

Example 1

To latex preserved with ½% ammonia and having a concentration of about 35%, there is added 1% of lauric acid in the form of ammonium laurate and ¾% of ammonium chloride, these latter figures being based on 100 parts of solids in the latex. The latex was then spray dried and the resulting rubber was found to have a quick breakdown, and a high abrasion and flexing resistance when vulcanized.

Example 2

To a similar latex there was added 1% of lauric acid as ammonium laurate and then ½% of phosphoric acid as secondary ammonium phosphate. The latex was then spray dried and the resulting crude rubber was found to have a quick breakdown, good calendering and extruding properties and the vulcanized rubber had a good abrasion and flexing resistance.

Example 3

To a similar latex 1% of lauric acid as ammonium laurate was added and then 1% of monochloracetic acid as the ammonium salt. The latex was spray dried and the resulting crude rubber was found to have excellent breakdown and milling properties and when vulcanized to have a good abrasion and flexing resistance.

A standard method of determining the flexing resistance is to build up a pad of alternate plies of fabric and the rubber stock to be tested, vulcanize this pad in a mold, cut the vulcanized material into strips of standard size and then to flex the strips by bending them in a machine until the plies separate.

A standard method of determining abrasion resistance is to form small slabs of the rubber stock to be tested, vulcanize the slabs for varying periods of time, and then subject each slab to the action of a rotary abrading device. The amount of wear that develops after a definite time is then measured.

These tests were the ones used in arriving at the data given in the present specification.

The following table gives in condensed form the results obtained by the use of ammonium salts of various strong water soluble acids and the ammonium soaps of various fatty acids:

| Parts of material added per 100 parts of spray dried rubber | | | | | | | Physical characteristics | | | | |
|---|---|---|---|---|---|---|---|---|---|---|---|
| HCl | Lactic | Cl-acetic | $H_3PO_4$ | FAPO* | FACO** | Undecylenic acid | Relative flexing | | Relative hardness | Relative abrasion | |
| | | | | | | | 1st | 2nd | 1st | 1st | 2nd |
| --- | --- | --- | --- | --- | 1 | --- | 100 | 100 | 100 | 100 | 100 |
| --- | 2 | --- | --- | --- | 1 | --- | 127 | 111 | 87 | 90 | 90 |
| --- | 2 | --- | --- | --- | 1 | --- | 162 | 187 | 82 | 96.5 | 92 |
| --- | --- | --- | --- | --- | --- | 1 | 100 | 100 | 100 | 100 | 100 |
| --- | --- | --- | --- | --- | 2 | 1 | 183 | 132 | 80 | 86 | 93 |
| --- | --- | --- | --- | --- | 2 | 1 | 265 | 148 | 67 | 97 | 94 |
| --- | --- | --- | --- | --- | --- | 1 | 100 | 100 | 100 | 100 | 100 |
| --- | --- | --- | --- | .75 | --- | 1 | 113 | --- | 78 | 98 | --- |
| --- | --- | --- | --- | .75 | --- | 1 | 250 | --- | 82 | 101 | --- |
| --- | --- | --- | --- | --- | --- | --- | 100 | 100 | 100 | 100 | 100 |
| .75 | --- | --- | --- | --- | --- | --- | 130 | 109 | 85 | 86 | 86.5 |
| .75 | --- | --- | --- | --- | --- | --- | 278 | 175 | 81 | 99 | 95 |
| --- | --- | --- | --- | --- | --- | 1 | 100 | 100 | 100 | --- | --- |
| --- | 1.5 | --- | --- | --- | --- | --- | 125 | 155 | 88 | 100 | 100 |
| --- | 1.5 | --- | --- | --- | --- | --- | 205 | 400 | 80 | 101 | 106 |
| --- | --- | --- | --- | --- | --- | 1 | 100 | 100 | 100 | --- | --- |
| --- | --- | --- | 1.5 | --- | --- | --- | 230 | 200 | 76 | 100 | 100 |
| --- | --- | --- | 1.5 | --- | --- | --- | 235 | 900 | 70 | 108 | 110 |
| --- | --- | --- | --- | --- | --- | 1 | 100 | 100 | 100 | --- | --- |
| --- | --- | 2 | --- | --- | --- | --- | 182 | 145 | 82 | 100 | --- |
| --- | --- | 2 | --- | --- | --- | --- | 225 | 184 | 68 | 100 | --- |
| --- | --- | --- | --- | --- | --- | 1 | 100 | 100 | --- | 100 | --- |
| 1.5 | --- | --- | --- | --- | --- | --- | 125 | --- | --- | 114 | --- |
| 1.5 | --- | --- | --- | --- | 1 | --- | 100 | --- | --- | 100 | --- |
| --- | 1.5 | --- | --- | --- | --- | --- | 122 | --- | --- | 106 | --- |
| --- | 1.5 | --- | --- | --- | 1 | --- | 100 | --- | --- | 100 | --- |
| --- | --- | 1.5 | --- | --- | --- | --- | 105 | --- | --- | 100 | --- |
| --- | --- | 1.5 | --- | --- | 1 | --- | | | | | |
| Blank—without added substances gives the following values | | | | | | | 100 | --- | 94 | 93 | --- |

\* Fatty acids palm oil.
\*\* Fatty acids of cocoanut oil.

In all the above cases the ammonium compounds of the acids or oils were used.

It will be seen by a comparison of the tests (1) of the spray dried rubber blank, with similar stocks containing (2) only the ammonium soaps of fatty acids, (3) only the ammonium salts of strong water soluble acids, and (4) the combination of (2) and (3), that the flexing resistance of (4) instead of merely being a mean between that obtained for each of the salts alone, is far greater than either of them. In the case where the ammonium soap of cocoanut oil was used, two flexing tests each gave 100, the same as that given by the blank, and the average of two tests using ammonium lactate gave about 119, but the average of the test in which both the ammonium soap of cocoanut oil and the ammonium salt of lactic acid were used was 175. Similar results will in general be noted with the tests of other materials and with the tests for hardness and abrasion. The table shows that while by the addition of the combination the greatest relative improvement is in the flexing value, there is also a marked decrease in the hardness of the rubber which is a measure of the improvement in milling properties, and the abrasion value is definitely increased over that of the blank. Therefore, the result obtained by the present invention is not the sum of the results obtained by the use of the separate materials but goes far beyond such sum.

It has been found that where one part of the fatty acid of cocoanut oil (as the ammonium soap) has been combined with an ammonia latex, that to obtain the optimum effects from the standpoints of abrasion, flexing and breakdown, about 3/4% should be used of ammonium phosphate or ammonium chloride, 1 1/2 % of ammonium lactate and about 1% of ammonium chlor acetate.

The invention is also applicable when a creamed latex is used, the only difference being that, as the creamed latex contains a reduced amount of non-rubber solids, a smaller amount of the volatile base compounds is required, and in the case of latex creamed a plurality of times a corresponding further reduction is made in the quantity of compounds added.

The figures above given are merely illustrative, and it is obvious that the optimum quantities of compounds to be added for various conditions can be readily determined by experiment.

While the invention has been described as applied to a natural rubber latex, it is applicable to any latex, natural or artificial, where similar conditions prevail.

Having thus described my invention, what I claim and desire to protect by Letters Patent is:

1. A process for improving the properties of rubber in both its raw and vulcanized state, which comprises incorporating in a rubber latex a volatile base soap of a higher fatty acid and a water soluble substance which hydrolizes to produce volatile positive ions and acid ions capable of decomposing ammonium soaps and proteinates, and drying to solid form.

2. A process for improving the properties of rubber in both its raw and vulcanized state, which comprises incorporating in a rubber latex a volatile base soap of a higher fatty acid and a water soluble substance which hydrolizes to produce volatile positive ions and acid ions capable of decomposing ammonium soaps and proteinates, and drying the latex with retention of its water soluble constituents.

3. A process for improving the properties of rubber in both its raw and vulcanized state, which comprises incorporating in a rubber latex a volatile base soap of a fatty acid having approximately 10–30 carbon atoms and a volatile base salt of a strong water soluble acid capable of decomposing ammonium soaps and proteinates, and spray drying the mixture.

4. A process for improving the properties of rubber in both its raw and vulcanized state, which comprises incorporating in a rubber latex an ammonium salt of a higher fatty acid and an ammonium salt of a strong water soluble acid capable of decomposing ammonium soaps and proteinates, and drying with retention of water soluble constituents.

5. A process for improving the properties of rubber both in its raw and vulcanized state, which comprises incorporating in a rubber latex an ammonium soap of an acid selected from the group consisting of oleic, undecylenic, lauric, palmitic, margaric and stearic, and an ammonium salt of a strong water soluble acid capable of decomposing ammonium soaps and proteinates, and drying to solid form.

6. A process for improving the properties of rubber in both its raw and vulcanized state, which comprises incorporating in a rubber latex a volatile base soap of a fatty acid having approximately 10–30 carbon atoms and a volatile base salt of an acid selected from the group consisting of hydrochloric, hydrobromic, hydrofluoric, phosphoric, lactic, oxalic, citric, chloracetic, nitric, and sulphurous acids, and drying the latex to solid form.

7. A process for improving the properties of rubber both in its raw and vulcanized state, which comprises incorporating in a rubber latex a volatile base soap of a fatty acid having approximately 10–30 carbon atoms, and a volatile base salt of a strong water soluble acid capable of decomposing ammonium soaps and proteinates, drying the latex, and processing and vulcanizing the resulting rubber.

8. An all-solids-content-latex rubber containing the hydrolization residuum of a volatile base salt of a higher fatty acid and a volatile base salt of a water soluble strong acid capable of decomposing ammonium soaps and proteinates.

9. An all-solids-content-latex rubber containing the hydrolization residuum of an ammonium salt of a fatty acid having approximately 10–30 carbon atoms and an ammonium salt of a water soluble strong acid capable of decomposing ammonium soaps and proteinates.

10. The dried residue of a rubber latex, an ammonium salt of a fatty acid having approximately 10–30 carbon atoms, and an ammonium salt of an acid selected from the group consisting of hydrohalogen, phosphoric, nitric, sulphurous, lactic, oxalic, citric, and chloracetic acids.

11. Vulcanized rubber comprising the dried and vulcanized residue of a rubber latex, a volatile base salt of a higher fatty acid, and a volatile base salt of an acid selected from the group consisting of hydrohalogen, phosphoric, nitric, sulphurous, lactic, oxalic, citric, and chloracetic acids.

Signed at Passaic, county of Bergen, State of New Jersey, this 10th day of December, 1929.

JOHN McGAVACK.